No. 643,625. Patented Feb. 20, 1900.
R. S. BIRCH.
RUNNING GEAR FOR VEHICLES.
(Application filed Nov. 13, 1899.)
(No Model.)

Witnesses
J. G. Hinkel
H. M. Gillman, Jr.

Inventor
Richard Shreve Birch
by Foster Freeman
Attorneys

THE NORRIS PETERS CO., PHOTO-LITHO., WASHINGTON, D. C.

UNITED STATES PATENT OFFICE.

RICHARD SHREVE BIRCH, OF BURLINGTON, NEW JERSEY.

RUNNING-GEAR FOR VEHICLES.

SPECIFICATION forming part of Letters Patent No. 643,625, dated February 20, 1900.

Application filed November 13, 1899. Serial No. 736,839. (No model.)

*To all whom it may concern:*

Be it known that I, RICHARD SHREVE BIRCH, a citizen of the United States, residing in the city and county of Burlington and State of New Jersey, have invented certain new and useful Improvements in Running-Gear for Vehicles, of which the following is a specification.

My invention relates to certain improvements in the running-gear of vehicles having double perches; and my invention consists of a yoke adapted to be connected to or forming part of said perches and for attachment to the axle and spring, as fully set forth hereinafter and as illustrated in the accompanying drawings, in which—

Figure 1:
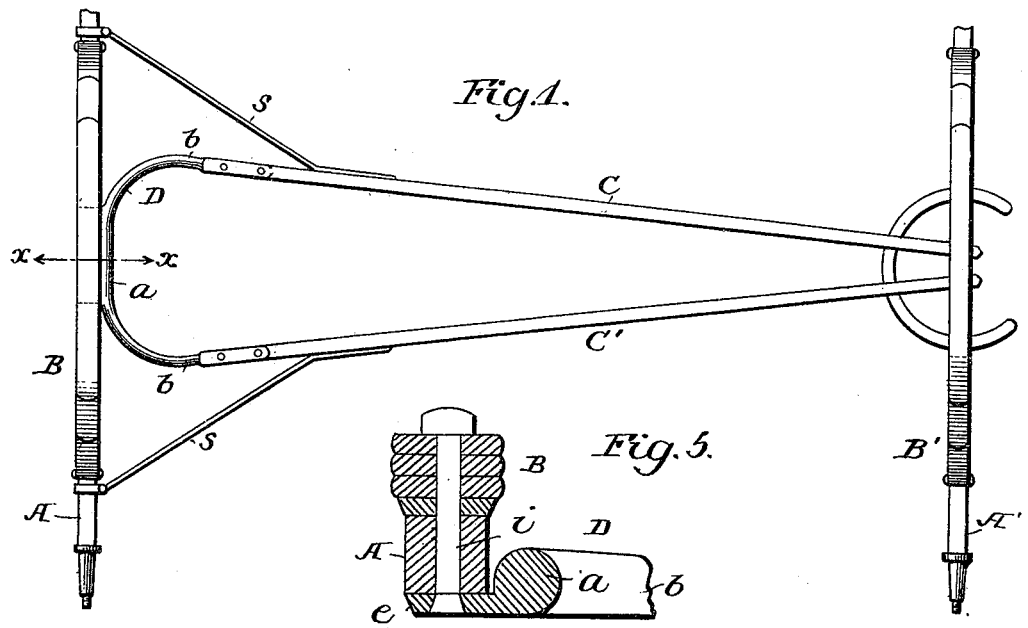
Figure 5:
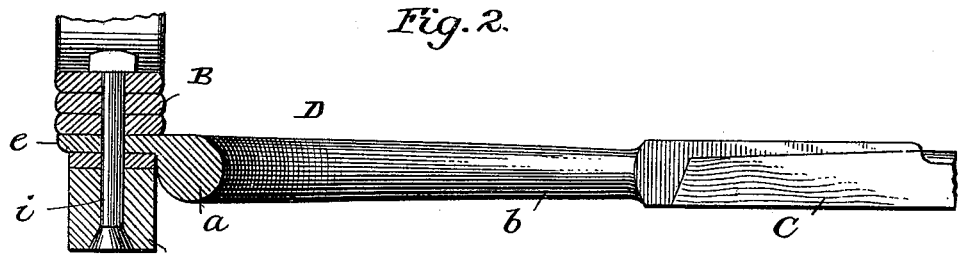
Figure 2:
Figure 3:
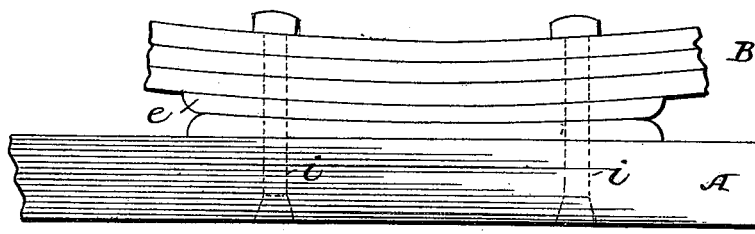
Figure 4:
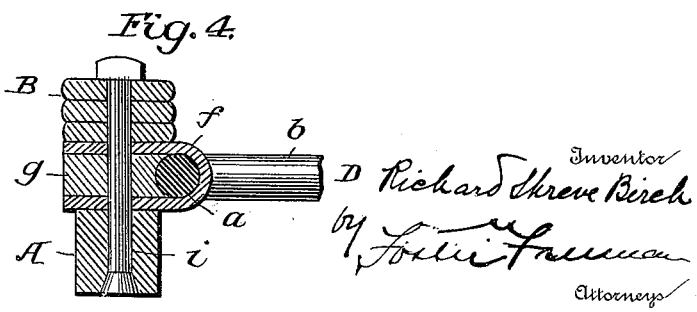

Figure 1 is a plan view showing sufficient of the running-gear of a vehicle to illustrate my improvement. Fig. 2 is an enlarged transverse section on the line $x$, Fig. 1. Fig. 3 is a rear view; Figs. 4 and 5, sectional views illustrating modifications.

A A' represent the axles of the vehicle, B B' the springs, and C C' the usual perches, which may be arranged in the usual or in any suitable manner. The perches C, however, instead of extending back to the rear axle and being clipped or otherwise secured thereto, as usual, are connected to or form part of a yoke D, having a central transverse portion $a$ and two arms $b\ b$, which are connected to the remaining portions of the perches, if the latter are of wood, or they may be formed of metal integral therewith.

From the rear edge of the transverse portion $a$ of the yoke D extends a rib $e$, which may be interposed between the rear axle A and the spring B, and the latter, instead of being clipped to the axle, as usual, is secured thereto and to the rib $e$ by means of bolts $i$, passing through the rib and through the axle, as shown. By this arrangement I avoid the use of clips for connecting either the perches or the springs to the axle, I secure a much stronger and more rigid attachment both for the perches and the springs, and improve the rigidity of the perch portion of the vehicle.

The parts need not be of the precise shape and proportion shown, and the rib $e$ need not necessarily be formed integral with the portion $a$ of the perch. For instance, the latter may be circular in cross-section, and a sheet of metal $f$ may be bent around the same and on opposite sides of a block $g$, as shown in Fig. 4, the ends of the sheet and the block being interposed between the spring and the axle and secured by bolts, as shown.

While I have shown the yoke as consisting of a single piece, it may consist of two separate portions divided on the line $x$, as shown in Fig. 1.

If desired, the perches may be braced laterally by braces $s$, as shown.

In the construction shown in Fig. 5 the yoke is bolted to the under side of the axle.

Without limiting myself to the precise constructions and arrangements of the parts shown, I claim as my invention—

1. The combination with the axle and spring of a vehicle, of a yoke connected to or forming part of the perches of the vehicle and provided with a portion which is connected with the spring and axle, substantially as set forth.

2. The combination with the spring and axle of a vehicle, of a yoke D having a rib $e$ and bolts $i$ passing through the spring, rib and axle securing the whole together, substantially as set forth.

3. The combination with the axle and spring of a vehicle, of a yoke having arms $b\ b$ and transverse portion $a$, and a rib extending between the spring and axle and secured thereto, substantially as set forth.

4. As an article of manufacture, a yoke D having a transverse portion $a$ with rib $e$ and arms $b\ b$ adapted for attachment to and forming part of the perches of the vehicle, substantially as set forth.

5. The combination with the axle and spring of a vehicle, of a yoke connected to or forming part of the perches of the vehicle and provided with a portion which is connected with the spring and axle and braces $s$, substantially as set forth.

In testimony whereof I have signed my name to this specification in the presence of two subscribing witnesses.

RICHARD SHREVE BIRCH.

Witnesses:
J. H. BIRCH, Jr.,
W. H. COON.